April 14, 1959     R. L. NOLAND     2,882,072
END CONNECTOR EMBEDDED IN A RIGID NON-METALLIC TUBE
Filed Jan. 13, 1955
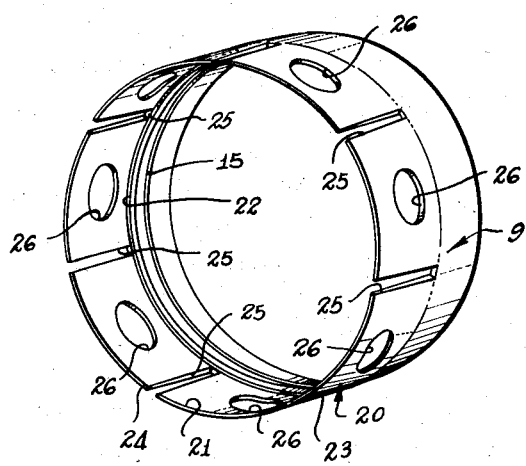
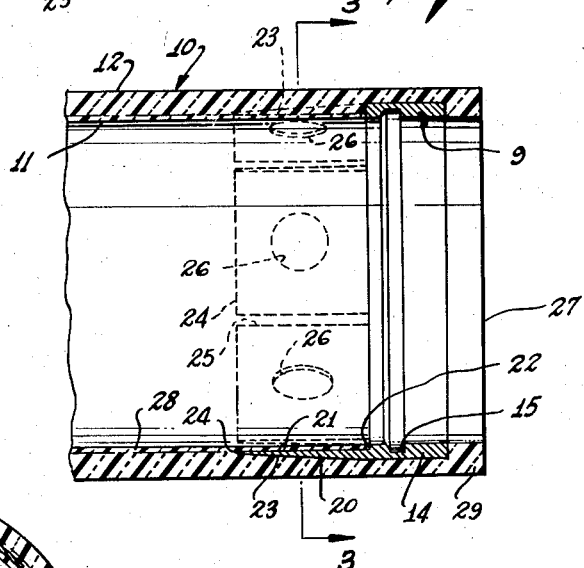
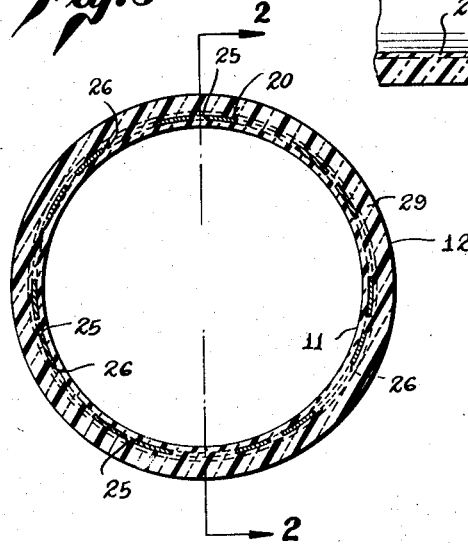
INVENTOR.
ROBERT L. NOLAND
BY *Fulwider Mattingly & Huntley*
Attorneys United States Patent Office
2,882,072
Patented Apr. 14, 1959

2,882,072

END CONNECTOR EMBEDDED IN A RIGID NON-METALLIC TUBE

Robert L. Noland, Duarte, Calif., assignor, by mesne assignments, to Reinhold Engineering & Plastics Co., Inc., Marshallton, Del., a corporation of Delaware Application January 13, 1955, Serial No. 481,522

5 Claims. (Cl. 285—114)

My invention relates to molded or fabricated non-metallic tubing, and has particular reference to an end connector for thin-walled fiberglass or plastic tubing which finds particular utility when used to secure an end closure to tubes intended to be subjected to high internal pressures such as are encountered in rocket motors.

Since the development of various rocket propelled devices for airborne use, there has been a continuous effort to develop lightweight tubes having sufficient strength to withstand the great internal pressures produced by the firing of the rocket. The principal efforts have been directed to the use of plastics and plastic impregnated fiberglass materials, since such tubes may be made with relatively thin walls of sufficient tensile strength to withstand the radial and axial forces, and are sufficiently lightweight to be used advantageously in airborne equipment.

A serious problem, however, has heretofore existed in anchoring the end closures and nozzles in such manner as to withstand the axial and radial forces produced by the firing of the rocket. Prior attempts to anchor such closures by means of a metal insert molded into the tube near the end to be closed have not been entirely successful in that they caused cracks to develop in the fiberglass tube at the location of the insert. Such tube failures are caused by the great difference between the moduli of elasticity of the fiberglass material and the insert, resulting in unequal expansion under internal pressure and the consequent breaking of the bond between the insert and the tube, leaving a weakened tube section which fails under pressure.

It is a primary object of my invention to provide an end connector for thin-walled fiberglass or plastic tubes that overcomes the above-mentioned disadvantages by providing sufficient radial flexibility and an adequately strong bond between the connector and the material of the tube to eliminate failures due to cracking of the tubing.

It is also an object of my invention to provide a connector of the character described which includes means for mechanically interlocking the connector and the fiberglass material to thereby hold the connector against axial displacement.

It is an additional object of my invention to provide a connector of the character set forth in the preceding paragraphs which is so proportioned as to permit molding thereof into thin-walled fiberglass tubing without increasing the outside diameter or decreasing the inside diameter of the tubing.

It is a still further object of my invention to provide a connector of the character set forth in the preceding paragraphs which includes a thin flexible skirt particularly adapted to be molded into the body of the tube to provide a flexible reinforcement of the tube material sufficient to minimize local expansion under pressure and to provide a relatively large area for bonding to the material of the tubing.

Other objects and advantages of my invention will be apparent from a consideration of the following specification read in connection with the accompanying drawings wherein:

Fig. 1 is a perspective view of a preferred form of an end connector constructed in accordance with my invention;

Fig. 2 is a longitudinal sectional view of a fragment of a non-metallic tubing showing the installation of the end connector illustrated in Fig. 1, Fig. 2 being taken on the line 2—2 of Fig. 3; and Fig. 3 a cross sectional view taken substantially along the line 3—3 of Fig. 2.

Referring to the drawings, I have illustrated in Figure 1, as a preferred embodiment of my invention, an end connector 9 particularly adapted for fabrication into a thin-walled non-metallic tube such as that shown at 10 in Figure 2 having an inner surface 11 and an outer surface 12. The connector 9 includes tubular body portion 14 having an inner diameter the same as the inner diameter of the tube 9, so that the inner surface may be flush with the inner surface 11 of the tube, and having an outer diameter substantially less than the outside diameter of the tube 10. The body portion 14 provides an attachment means which may comprise a groove 15 adapted to receive a snap-ring, lockwire, or other abutment means for securing to the body portion 14 an end closure, nozzle, or other object as may be desired, such attachment means serving to hold such object against longitudinal displacement in at least one direction with respect to the connector 9.

The connector 9 also includes a flexible skirt portion 20, preferably formed integrally with the body portion 14. The skirt 20 provides an inner cylindrical surface 21 somewhat larger in diameter than the inside diameter of the body 14 to define a radial shoulder 22. The skirt 20 is thus made of less radial thickness than the body 14 to make it more flexible. Additional flexibility may be secured by tapering the outer surface as indicated at 23 so as to provide a thin feather edge 24 at the extreme end of the skirt 20. To provide still greater flexibility, the skirt 20 is formed with a plurality of circumferentially spaced longitudinal slots 25 extending inwardly approximately to the shoulder 22.

The skirt 20 is also formed with locking holes 26, herein illustrated as equally spaced between adjacent slots 25, which provide a mechanical interlocking of the connector 9 with the tube 10, it being understood that the material of the tube 10 disposed within and without the skirt 20 is integrally joined by the material filling the holes 26. The tube body is formed in a known manner by wrapping the fibers about a mandrel along with a suitable bonding material, the impregnated tube thus formed being hardened, as by appropriate heat treatment, before the mandrel is removed.

When used as an end connector for anchoring an end closure in the tube 10, the end connector 9 is positioned relatively adjacent the end 27 of the tube with the body portion 14 nearest the end 27 and the skirt 20 disposed inwardly of the body portion 14. Accordingly, in fabricating the tubing, the wrapping of the glass fibers is started at a point corresponding to the desired location of the shoulder 22 and is carried along the mandrel to the location of the opposite end of the tubing section; the wrapping is continued until an initial layer 28 is built up to a diameter substantially equal to the inner diameter 21 of the skirt 20. The connector 9 is then slipped over the mandrel so that the skirt 20 overlies the layer 28 with the shoulder 22 abutting the end thereof. The remainder of the wall of the tube 10 is then built up to its desired outer diameter 12 by continuing the winding or wrapping on each side of the connector 9 and then over the outside of the connector so that the entire connector is covered by the wrapping.

The impregnation of the tubing with the bonding material is preferably carried on simultaneously with the wrapping of the material about the mandrel. If fibrous sheet material such as felt or cloth is used, it is preferably painted or impregnated with the bonding material before it is wrapped about the mandrel. If the wrapping is done with a filament or a yarn, the filament or yarn preferably fed through a bath of liquid bonding material so as to carry a substantial quantity of bonding material to the tubing as the tubing is built up.

When the tubing has been fabricated in the manner described, the bonding material is then hardened. A preference is expressed for a thermo-setting plastic as the bonding material, in which event the material is cured by a suitable heat treating operation. It will be understood also that the amount of the bonding material so applied is sufficient to thoroughly impregnate the fabricated tubing, as is conventional in the forming of fiberglass tubes. This bonding material flows through and fills the holes 26 and the slots 25 so that upon hardening, it will lock the connector 9 firmly in its desired position within the tube. The hardening of the bonding material serves to join the fibrous material and the impregnating plastic into a single unitary rigid structure.

It has been found that when constructed and installed in a tube as described, the end connector 9 of this invention provides an anchorage for end closures, nozzles, and the like which will withstand extremely high internal pressures without cracking of the tubing or rupture of the joint between the tubing and the connector. For example, fiberglass tubes having an outside diameter of 2.75 inches and an inside diameter of 2.61 inches have been tested and operated at pressures as high as 3000 pounds per square inch without failure of any kind. These results are due to the unique construction and mode of installation of the connector 9, particularly the provision of the skirt 20. The skirt 20 provides a large surface area which is adhesively bonded to the plastic tube material on both the inner and outer surfaces and is additionally mechanically anchored by the plastic material filling the holes 26 and the slots 25. The skirt portion is relatively flexible radially, permitting it to expand as the tubing expands under pressure, thus preventing any disturbance of the bond between the skirt 20 and the tubing 10. In so doing, the material of the skirt 20 serves to reinforce the material of the tubing 10, thus serving also to reduce to a minimum the radial expansion of the tubing at the location of the body portion 14 of the connector 9. The tapering thickness of the skirt provides for a gradual change in the wall thickness of the tube so as to minimize the discontinuities and their effect on the strength of the tubing. The body portion 14 of the connector 9 serves to carry the tensile and bearing loads.

While in the preferred embodiment of the invention illustrated in the drawings and described in the foregoing the attachment means provided by the body portion 14 comprises the circumferential recess 15 adapted to receive a snap-ring or lockwire, it is to be understood that my invention contemplates other forms of attachment means such as continuous or interrupted threads, plugs, shoulders, and the like. Also, while the invention has been described with reference to a metallic connector formed of a suitably hard and strong metal such as steel, installed or fabricated within a fiberglass and plastic tubing, it will be appreciated that other connector materials and other tubing materials may be employed, the above-described advantageous results being secured in those cases where the tubing has a relatively thin wall and where there is a substantial disparity between the moduli of elasticity of the tubing material and the connector material.

While I have illustrated and described the preferred embodiment of my invention, the same is not to be limited to the details of construction illustrated and described, except as defined in the appended claims.

I claim:

1. An article of manufacture comprising a rigid cylindrical fiberglass tube having given inner and outer diameters, the material of said tube being characterized by radial expansion in the presence of high radial forces created therein; and a substantially cylindrical tubular metal connector embedded in and bonded to said tube, said connector having an outer diameter less than the outer diameter of said tube and an inner diameter substantially equal to the inner diameter of said tube, said connector having a plurality of longitudinal slots in one end portion, thereby to form a plurality of axially extending flexible elements, said flexible elements being adapted on expansion of the tube in the vicinity thereof to move radially so as to maintain the bond between the tube material and said flexible elements, the other end portion being circumferentially continuous, the inner surface of said connector being also formed with attachment means at said other end portion and adapted to secure an object against axial movement in at least one direction within said tube.

2. An article of manufacture comprising a rigid cylindrical fiberglass tube having given inner and outer diameters; and a substantially cylindrical tubular metal connector embedded in said tube, said connector having an outer diameter less than the outer diameter of said tube and an inner diameter substantially equal to the inner diameter of said tube, said connector having a plurality of longitudinal slots in one end portion, the other end portion being circumferentially continuous, the inner surface of said connector being also formed with attachment means at said other end portion and adapted to secure an object against axial movement in at least one direction within said tube, said one end portion having a plurality of circumferentially spaced apertures filled with fiberglass material integral with the wall of said tube, whereby to lock said tube and said connector together.

3. An article of manufacture comprising a rigid cylindrical fiberglass tube having given inner and outer diameters; and a substantially cylindrical tubular metal connector bonded to said tube, said connector having a circumferentially continuous body portion at one end having an outer diameter less than the outer diameter of said tube and an inner diameter substantially equal to the inner diameter of said tube, said connector also having a skirt portion at the other end having an outer diameter less than the outer diameter of said tube and an inner diameter greater than the inner diameter of said tube to thereby define a shoulder adjacent said body portion, said skirt portion having a plurality of circumferentially spaced slots extending axially from said other end, said slots dividing said skirt portion into a plurality of radially movable elements, said radially movable elements being imbedded in said tube and adapted upon radial movement of said tube in the vicinity thereof to move radially so as to maintain the bond with said tube, the inner surface of said body portion being formed with attachment means adapted to secure an object against axial movement in at least one direction within said tube.

4. An article of manufacture comprising a rigid cylindrical fiberglass tube having given inner and outer diameters; and a substantially cylindrical tubular metal connector having a circumferentially continuous body portion at one end having an outer diameter less than the outer diameter of said tube and an inner diameter substantially equal to the inner diameter of said tube, said connector also having a skirt portion at the other end having an outer diameter less than the outer diameter of said tube and an inner diameter greater than the inner diameter of said tube to thereby define a radial shoulder adjacent said body portion, said skirt portion having a plurality of circumferentially spaced slots extending axially from said other end, the inner surface of said body portion being formed with attachment means adapted to secure on object against axial movement in at least one direction within said tube, said skirt portion having a plurality of circumferentially spaced apertures filled with fiberglass material integral with the wall of said tube, whereby to lock said tube and said connector together.

5. An article of manufacture according to claim 3 in which said skirt portion is tapered to a thin edge remote from said body portion.

References Cited in the file of this patent

UNITED STATES PATENTS

| | | |
|---|---|---|
| 1,567,324 | Jurs | Dec. 29, 1925 |
| 1,609,660 | Phelps | Dec. 7, 1926 |
| 1,847,218 | Lamb | Mar. 1, 1932 |
| 2,076,632 | Goodall | Apr. 13, 1937 |
| 2,315,225 | Rogers | Mar. 30, 1943 |
| 2,336,488 | Litton | Dec. 14, 1943 |
| 2,567,773 | Krupp | Sept. 11, 1951 |

FOREIGN PATENTS

| | | |
|---|---|---|
| 837,937 | France | Nov. 28, 1938 |
| 955,523 | France | June 27, 1949 |